Nov. 13, 1962   L. N. YOHE   3,063,668
OUTRIGGER
Filed Dec. 14, 1959
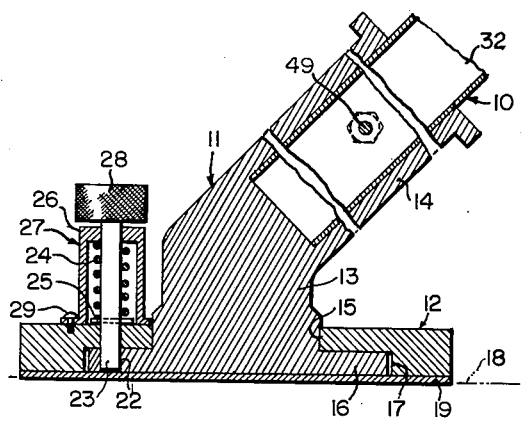
FIG.3
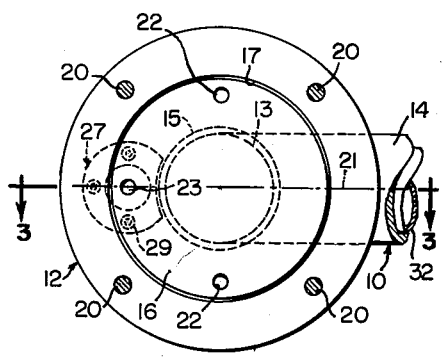
FIG.2
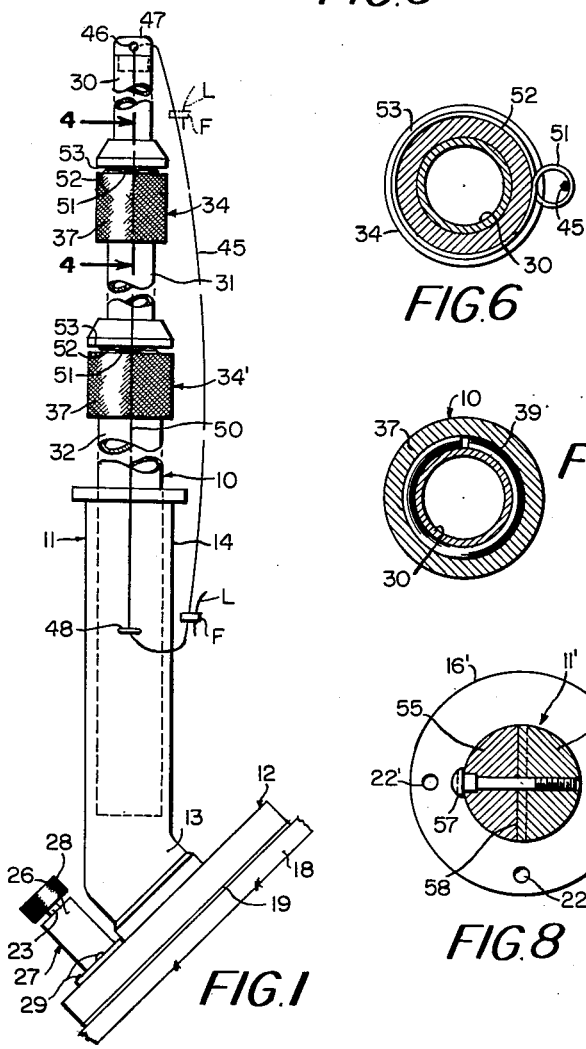
FIG.1
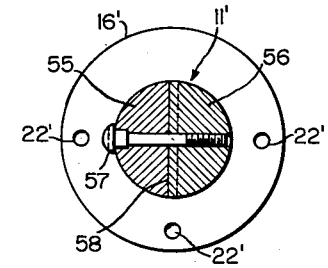
FIG.6
FIG.5
FIG.8
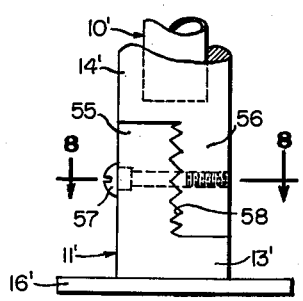
FIG.4
FIG.7
INVENTOR.
LESTER N. YOHE
BY
AGENT 3,063,668
OUTRIGGER
Lester N. Yohe, 1601 Melrose Ave., Havertown, Pa.
Filed Dec. 14, 1959, Ser. No. 859,312
5 Claims. (Cl. 248—279)

The invention hereinafter described and claimed relates to outriggers. More particularly, however, the invention has to do with outriggers of the type providing a spar for extending fishing lines out and beyond the gunwale of a boat.

With the recent increase in boating and fishing enthusiasts has come a co-extensive increase in the burden on bridge tenders. Many boats are equipped with tall outriggers for extending fishing or trolling lines out and beyond the wake of the moving boat and into calmer water where the fish are more apt to take the lure or bait. These outriggers usually are too high to pass under most of the low level highway and railroad bridges around the areas where boating and fishing are most popular, and where the greatest number of fishing boats are harbored. When making their way from their inland harbor to deep water where fishing is best, it is often necessary for several bridges to be opened to let the boats through. Often times, because of bridge traffic, it is inconvenient for the bridge to be opened and boats must wait until it can be opened conveniently. It is not unusual for a number of boats to be affected in this manner simultaneously, resulting in a loss of valuable time in reaching the fishing ground, not to mention the expense involved in operating the bridge.

The primary object of the present invention is to provide an outrigger which overcomes the above difficulties.

Mor specifically it is an object of the invention to provide a telescoping outrigger movable between a retracted inoperative position within the boundary lines of a boat, to an operative position extending outwardly beyond the gunwales, or boundary, of the boat.

Another object of the invention is to provide such an outrigger which is adjustable both as to height or length, and as to its position relative to the boat.

In accordance with the above objects, and first briefly described, the invention comprises a multi-section telescoping spar, or pole, rotatably mounted on a base provided with means for securement to a suitable part, such as the gunwale of a boat, whereby the outrigger may be swung about its pivot between an inoperative position wherein the spar is in a retracted or shortened condition and extending over the boat, and an operative position with the pole extended and turned to a position projecting outwardly from the side of the boat.

In the drawings:
FIG. 1 is a side view of apparatus embodying the invention, with parts broken away;
FIG. 2 is a fragmentary plan view of a portion of the apparatus;
FIG. 3 is a sectional view taken along the line 3—3 of FIG. 2;
FIG. 4 is a sectional view taken along the line 4—4 of FIG. 1;
FIG. 5 is a sectional view taken along the line 5—5 of FIG. 4;
FIG. 6 is a sectional view taken along the line 6—6 of FIG. 4;
FIG. 7 is a side elevational view of a fragmentary portion of a modified form of the invention; and
FIG. 8 is a sectional view taken along line 8—8 of FIG. 7.

More specifically and with reference to the details of the drawings, and first to FIGS. 1, 2 and 3, it is seen that the preferred form of the invention comprises a telescoping pole or spar 10, fixed to a standard 11, pivotally mounted with respect to a circular base plate 12.

Standard 11 includes an upwardly extending stud portion 13 terminating at its upper end in a sleeve portion 14 preferably angularly disposed at 45° to the horizontal. The stud extends through a hole 15 centrally located in plate 12 and is provided with a bottom flange 16 matingly received within a complementary recess 17 formed in the bottom surface of the plate 12.

Plate 12 is secured to the catwalk on gunwale 18 of a boat, preferably in a horizontal plane and with a thin metal plate 19 interposed between the deck and the base plate 12 to prevent wear of the deck planking and consequent looseness of the pivotal relationship of the plate 12 with the flange 16 of the standard 11. Securement of plate 12 to the decking of the gunwale may be in any convenient manner but preferably is by means of heavy screws 20 placed 90° apart and so positioned as to always have at least two screws evenly dividing the weight of the assemblby between them. In other words, and in normal use, the axis 21 of spar 10, see FIG. 2, will bisect the angle between any two adjacent screws. To assure this positioning the flange 16 of stud 13 is provided with a series of holes 22 spaced 90° apart and adapted to receive the lower end of a detent rod 23 urged downwardly by a coil spring 24 encircling the rod and extending between a pin 25 through the rod and the upper end 26 of the detent housing 27. A handle or knob 28 is secured to the upper end of the rod for withdrawing its lower end from engagement with flange 16 enabling the standard 11 to be rotated. Detent housing 27 is secured to base plate 12 by suitable means such as screws 29, or it may be formed integrally with base 12.

Spar 10, as more clearly seen in FIG. 1, comprises a plurality of hollow rods or tubes, preferably three, as shown here identified by the numerals 30, 31 and 32, in descending order. These tubes are of progressively larger diameters from top to bottom to enable them to be telescoped one into another. With reference now to FIG. 4 it will be seen that the upper end of tube 31 is threaded as at 33 to receive a circular nut 34 preferably knurled to provide a finger grip for turning it on threads 33. The inner periphery of the upper end of tube 31 is tapered inwardly as at 35, to cooperate with an oppositely tapered portion 36 on the inner surface of nut 34 between its threaded lower end 37 and its upper end 38 surrounding tube 30.

Positioned between these tapered portions 35 and 36 is a discontinuous ring 39 having its ends slightly spaced from each other, as seen in FIG. 5, to permit its radial expansion and contraction. When nut 34 is turned downwardly on tube 31, ring 39 is trapped between the tapered portions which, as the nut is tightened, contract the ring radially against tube 30 thus to lock it against movement relative to tube 31. Of course this condition can be effected between either of the terminal positions, fully retracted or fully extended.

Still with reference to FIG. 4 it is seen that the upper end of tube 31 is provided with an inwardly projecting ridge 40 provided by turning in a peripheral portion of the tube wall. The ridge 40 is for the purpose of preventing tube 30 from being completely withdrawn from tube 31 when the spar is being extended, by engagement with an out-turned flange 41 on the lower end of tube 30. Flange 41 and ridge 40 also cooperate with the upper portion 38 of nut 34 to guide the tubes in their telescoping movements when the nut is loosened, and prevents strain on nuts 34 or 34'.

It will be understood, of course, that tube 31 is similarly telescoped relative to tube 32 as by loosening or tightening nut 34' which has the same relationship to tubes 31 and 32 as does nut 34 with tubes 30 and 31.

While the outrigger may be used for various purposes, its primary function, as mentioned above, is to extend fishing lines outwardly beyond the wake of a moving boat when trolling. To this end the spar 10 is provided with an endless line 45 extending between a hole 46 in a nylon cap 47 on the outer end of tube 30 and the ringed end 48 of the bolt 49 securing the spar to standard 11. One side 50 of the looped line also extends through rings 51 (FIG. 6) formed integrally with spring wire clips 52 and snapped into peripheral grooves 53 in nuts 34 and 34'. This line cooperates with suitable standard fixtures F which releasably attaches a fishing line L thereto, to raise the fishing line to the top of the spar when extended, and to extend the line outwardly from the side of the boat so that the lure end of the fish line will trail to the side and behind the boat, out of the boat's wake.

When fishing is over the spar is again turned inwardly and locked into position trim with the side of the boat, and telescoped to its retracted position to permit the boat to pass under bridges without lost time and without disturbing the bridge tender to open the bridge.

If it is desired to change the angle of the spar 10 relative to the stud 13 they may be arranged in accordance with the modification shown in FIGS. 7 and 8. Here the standard 11' is formed of separable parts comprising stud 13' and sleeve 14' having overlapping and mating end portions 55 and 56 respectively, by means of which they are secured together as by screw 57. The mating faces of the end portions 55 and 56 preferably are formed with mating teeth 58 extending radially from the screw 57. Angular adjustment of the spar 10' is obtained by loosening screw 57 sufficiently to rotate end portion 56 relative to end portion 55 about screw 57 as a pivot until the spar reaches the desired position, then tightening screw 57. The teeth 58 will provide positive means for holding spar 10' in its adjusted position.

I claim:

1. An outrigger for use on boats and to which a fishing line may be attached, comprising: a plurality of elongated tubes of successively smaller cross-section telescopically joined to form a spar movable between retracted and extended positions, a base plate for securement to a fixed portion of the boat, said base plate having a circular recess formed in its under surface and an axial hole extending from said recess through the upper face of said base plate, a standard having a flange portion rotatably mounted within said recess and a stud portion extending through said hole and terminating in a sleeve portion extending angularly upwardly from said stud portion, means securing one end of the largest cross-section tube within said sleeve portion, and means for releasably securing said flange portion to said base plate in predetermined radial positions wherein said spar may extend in selected fixed positions relative to said boat, in either a retracted or an extended position, said last means comprising circumferentially spaced detents in said flange portion, and a cooperating spring-loaded pin means on said base plate for selective locking engagement with said detents.

2. An outrigger for use on boats comprising: a plurality of elongated hollow tubes of successively smaller diameter telescopically joined to form a spar movable between retracted and extended conditions, a circular base plate for securement to a fixed portion of the boat, said base plate having an axial recess of circular configuration formed within its bottom face and a circular aperture of smaller diameter than said recess and extending through the top wall of said plate into said recess, a standard having a circular flange portion of substantially the same diameter as said recess and rotatably mounted within said recess, and a stud portion extending through said aperture and terminating in a sleeve portion extending angularly upwardly from said stud portion, means securing one end of the largest diameter tube within said sleeve portion, a wear plate secured to the bottom surface of said base plate over said recess, and means for releasably securing said flange portion to said base plate in predetermined angular positions wherein said spar may extend in selected fixed positions relative to said boat, in either a retracted or an extended condition.

3. A construction in accordance with claim 2 and including means for locking said tubes together at any selected condition of telescopic adjustment.

4. A construction according to claim 3 and further including means for stringing an endless line from the top to the bottom of said spar in a continuous loop.

5. An outrigger for use on boats comprising: a plurality of elongated tubes of successively smaller cross-section telescopically joined together to form a spar movable between retracted and extended positions; a base plate adapted for securement to a fixed portion of the boat; a standard having a base portion rotatably mounted on said base plate for rotation about an axis normal to said base plate; means on said base portion for securing one end of the largest cross-section tube to said base portion in an upwardly extending direction angularly related to said axis; means for releasably fixing said standard base portion to said base plate whereby when released said standard may be rotated relative to said base plate about said axis to position said spar in different radial positions relative to said base plate and then be releasably fixed in a selected radial position thus enabling adjustment of the radial position of said spar relative to the boat, and means for adjusting the angular relationship relative to said base portion of said means on said base portion for securing one end of the largest cross-section tube to said base portion.

References Cited in the file of this patent

UNITED STATES PATENTS

| | | |
|---|---|---|
| 1,360,584 | Rohrbaugh | Nov. 30, 1920 |
| 1,667,604 | Peters | Apr. 24, 1928 |
| 2,179,415 | Mace | Nov. 7, 1939 |
| 2,529,148 | Fratt | Nov. 7, 1950 |
| 2,580,130 | Rowdon | Dec. 25, 1951 |
| 2,595,597 | Morseth | May 6, 1952 |
| 2,912,196 | Johnson | Nov. 10, 1959 |
| 2,927,754 | Davis | Mar. 8, 1960 |

FOREIGN PATENTS

| | | |
|---|---|---|
| 451,680 | Great Britain | Aug. 10, 1936 |